(12) United States Patent
Venkateswaran et al.

(10) Patent No.: US 11,375,455 B2
(45) Date of Patent: *Jun. 28, 2022

(54) TECHNOLOGIES FOR ASSOCIATING AN OFFLINE WI-FI SYSTEM WITH A WIRELESS ACCESS POINT

(71) Applicant: Schlage Lock Company LLC, Carmel, IN (US)

(72) Inventors: Srikanth Venkateswaran, Carmel, IN (US); John Goodrich, Carmel, IN (US); David M. Baty, Indianapolis, IN (US); Christopher Green, Westfield, IN (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/223,842

(22) Filed: Apr. 6, 2021

(65) Prior Publication Data

US 2022/0060983 A1  Feb. 24, 2022

Related U.S. Application Data

(63) Continuation of application No. 16/774,713, filed on Jan. 28, 2020, now Pat. No. 10,972,979, which is a
(Continued)

(51) Int. Cl.
*H04W 52/02* (2009.01)
*H04W 76/10* (2018.01)
(Continued)

(52) U.S. Cl.
CPC ...... *H04W 52/0229* (2013.01); *G06F 1/3243* (2013.01); *G07C 9/00174* (2013.01);
(Continued)

(58) Field of Classification Search
CPC . H04W 52/0229; H04W 4/80; H04W 52/028; H04W 52/02; H04W 76/10; G06F 1/3243; G07C 9/00174; G07C 2009/00769
See application file for complete search history.

(56) References Cited

U.S. PATENT DOCUMENTS 9,913,216 B1   3/2018   Deshpande
10,548,084 B1   1/2020   Venkateswaran et al.
(Continued)

OTHER PUBLICATIONS

International Search Report; International Searching Authority; International Application No. PCT/US2020/025740; dated May 7, 2020; 2 pages.
(Continued)

*Primary Examiner* — Andrew Wendell
(74) *Attorney, Agent, or Firm* — Taft Stettinius & Hollister LLP (57) ABSTRACT

A method according to one embodiment includes establishing, by Bluetooth Low Energy (BLE) circuitry of an access control device, a BLE communication connection with a first mobile device while a main microprocessor and a Wi-Fi circuitry of the access control device are in sleep states; waking, by the access control device, the Wi-Fi circuitry of the access control device from the sleep state in response to establishing the BLE communication connection with the mobile device; establishing, by the Wi-Fi circuitry of the access control device, a Wi-Fi communication connection with an access control server in response to waking the Wi-Fi circuitry from the sleep state; and receiving, by the access control device and from the access control server via the Wi-Fi communication connection, access control data for the access control device transmitted from a second mobile device to the access control server.

22 Claims, 6 Drawing Sheets

Related U.S. Application Data continuation of application No. 16/369,916, filed on Mar. 29, 2019, now Pat. No. 10,548,084.

(51) Int. Cl.
  *G06F 1/3234* (2019.01)
  *G07C 9/00* (2020.01)
  *H04W 4/80* (2018.01)

(52) U.S. Cl.
  CPC ........... *H04W 4/80* (2018.02); *H04W 52/028* (2013.01); *G07C 2009/00769* (2013.01)

(56) References Cited

U.S. PATENT DOCUMENTS

| | | | |
|---|---|---|---|
| 10,972,979 B2* | 4/2021 | Venkateswaran | G07C 9/00174 |
| 2014/0049361 A1 | 2/2014 | Ahearn et al. | |
| 2014/0308898 A1 | 10/2014 | Lee et al. | |
| 2015/0230171 A1 | 8/2015 | Sun | |
| 2016/0212708 A1 | 7/2016 | Kim et al. | |
| 2016/0353382 A1 | 12/2016 | Xue | |
| 2017/0088072 A1 | 3/2017 | Curtis et al. | |
| 2017/0180933 A1 | 6/2017 | Steiner | |
| 2018/0027490 A1 | 1/2018 | Liu et al. | |
| 2018/0048750 A1 | 2/2018 | Hardi | |
| 2018/0084588 A1 | 3/2018 | Khoury et al. | |
| 2018/0338336 A1 | 11/2018 | Seo et al. | |
| 2019/0150093 A1 | 5/2019 | Kweon et al. | |
| 2020/0221293 A1 | 7/2020 | Kim et al. | |

OTHER PUBLICATIONS

Written Opinion of the International Searching Authority; International Searching Authority; International Application No. PCT/US2020/025740; dated May 7, 2020; 3 pages.

* cited by examiner

TECHNOLOGIES FOR ASSOCIATING AN OFFLINE WI-FI SYSTEM WITH A WIRELESS ACCESS POINT

CROSS-REFERENCE TO RELATED APPLICATIONS

The present application is a continuation of U.S. patent application Ser. No. 16/774,713 filed Jan. 28, 2020 and issued as U.S. Pat. No. 10,972,979, which is a continuation of U.S. patent application Ser. No. 16/369,916 filed Mar. 29, 2019 and issued as U.S. Pat. No. 10,548,084, the contents of each application incorporated herein by reference in their entirety.

BACKGROUND

The IEEE 802.11 standard outlines specific protocols for implementing Wi-Fi-based wireless local area network (WLAN) communications. The Bluetooth Special Interest Group (SIG) develops and outlines the standards for implementing Bluetooth communication. According to the 802.11 standard, a wireless network station device initiates the connection to a wireless access point, which is in contrast to a Bluetooth network, in which the central device initiates the connection to a peripheral device. As such, if a wireless network station device needs to communicate via the Internet, it must already be associated with a wireless access point. Power-sensitive Wi-Fi devices generally disassociate from provisioned access points when there is no data to transfer over a network and, therefore, some trigger is generally needed to cause the device to re-associate with the access point. For example, a user typically must physically interact with a station (e.g., via a mechanical button) to initiate the station to connection to a wireless access point.

SUMMARY

One embodiment is directed to a unique system, components, and methods for associating Wi-Fi circuitry of an access control device with a wireless access point and communicating data to the access control device. Other embodiments are directed to apparatuses, systems, devices, hardware, methods, and combinations thereof for associating Wi-Fi circuitry of an access control device with a wireless access point and communicating data to the access control device. This summary is not intended to identify key or essential features of the claimed subject matter, nor is it intended to be used as an aid in limiting the scope of the claimed subject matter. Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

Figure 1:
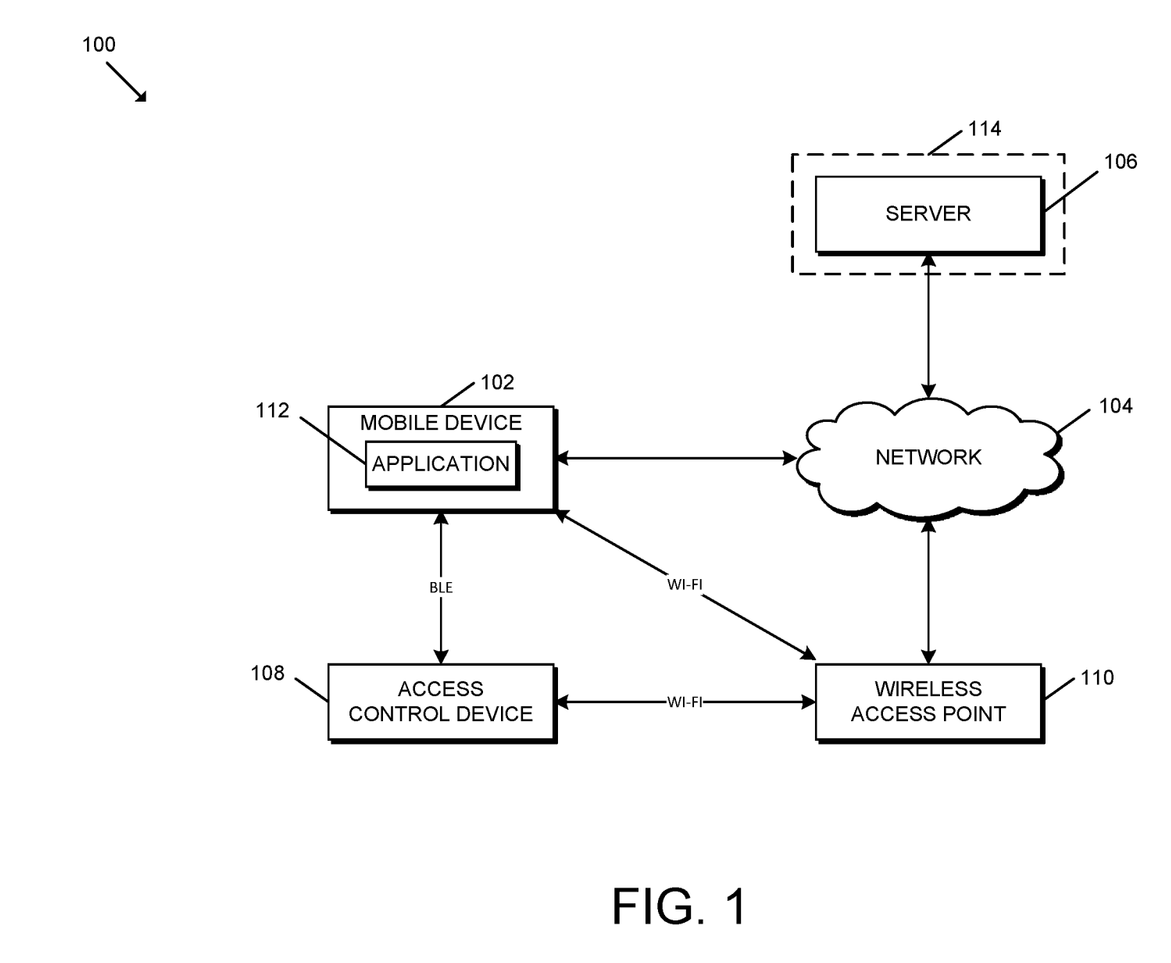
FIG. 1 is a simplified block diagram of at least one embodiment of an access control system.

Referring now to FIG. 1, in the illustrative embodiment, an access control system 100 for associating Wi-Fi circuitry of an access control device with a wireless access point and communicating data to the access control device includes a mobile device 102, a network 104, a server 106, an access control device 108, and a wireless access point 110. Although only one mobile device 102, one network 104, one server 106, one access control device 108, and one wireless access point 110 are shown in the illustrative embodiment of FIG. 1, the access control system 100 may include multiple mobile devices 102, networks 104, servers 106, access control devices 108, and/or wireless access points 110 in other embodiments. For example, in some embodiments, one mobile device 102 may communicate access control data and/or command information for a particular access control device 108, whereas another mobile device 102 may establish a Bluetooth Low Energy (BLE) communication connection with the access control device 108, causing the access control device 108 to activate its Wi-Fi circuitry and establish a Wi-Fi communication connection with the server 106 as described herein. Further, in some embodiments, the functions described herein as being performed by the server 106 may be performed by a distributed network of servers 106 (e.g., cloud servers operating in a cloud computing environment 114).

It should be appreciated that the system 100 and technologies described herein allow an access control device to be triggered by a Bluetooth central device to associate with a wireless access point and thereby perform Wi-Fi communications. Accordingly, the system 100 addresses deficiencies in the Wi-Fi station/access point architecture, allowing a station to be triggered to associate with an access point. It should be further appreciated that for synchronization and bandwidth considerations, for example, the server 106 may function as a single source of information such that the access control device 108 communicates with the server 106 for data received from the mobile device 102 (e.g., via Wi-Fi) rather than communicating directly with the mobile device 102 (e.g., via Bluetooth). As such, the access control device 108 may retrieve relevant data from the server 106 even if the mobile device 102 is nearby the access control device 108 (e.g., with Bluetooth range).

As described in greater detail below, the mobile device 102 transmits access control data and/or command data to the server 106 that is intended to be transmitted to a particular access control device 108. As such, the server 106 stores that data in association with the particular access control device 108. Upon subsequently interacting with a mobile device 102 (e.g., the same mobile device 102 that transmitted the access control data and/or command data or a different mobile device 102), the mobile device 102 establishes a BLE communication connection with the access control device 108 while a main microprocessor and Wi-Fi communication circuitry of the access control device 108 are in sleep states (e.g., low power states), which causes the Wi-Fi circuitry to wake from the sleep state to establish a Wi-Fi communication connection with the server 106. Thereafter, the access control device 108 may receive any relevant access control data and/or command data from the server 106. Further, in some embodiments, the access control device 108 may transmit audit data associated with the access control device 108 to the server 106.

It should be appreciated that the mobile device 102, the server 106, the access control device 108, and/or the wireless access point 110 may be embodied as any type of device or collection of devices suitable for performing the functions described herein. More specifically, in the illustrative embodiment, the mobile device 102 may be embodied as any type of device capable of communicating with the server 106 to transmit access control data and/or command data to the server 106 and/or capable of establishing a BLE communication connection with the access control device 108. As described above, it should be appreciated that the mobile device 102 transmitting the data to the server 106 and the mobile device 102 establishing a BLE connection with the access control device 108 to trigger its Wi-Fi connection with the server 106 may be the same mobile device 102 or different mobile devices 102 depending on the particular embodiment. However, for brevity of the description and without loss of generality, it should be appreciated that the mobile devices 102 may be referred to herein as being the same.

As shown in FIG. 1, the mobile device 102 includes an application 112 that enables the mobile device 102 to communicate various access control data and/or commands to the server 106 for subsequent transmission to the access control device 108. It should be appreciated that the application 112 may be embodied as any suitable application for performing the functions described herein. For example, in some embodiments, the application 112 may be embodied as a mobile application (e.g., smartphone application). In some embodiments, it should be appreciated that the application 112 may serve as a client-side user interface for a web-based application or service of the server 106.

The network 104 may be embodied as any type of communication network capable of facilitating communication between the various devices of the system 100. As such, the network 104 may include one or more networks, routers, switches, computers, and/or other intervening devices. For example, the network 104 may be embodied as or otherwise include one or more cellular networks, telephone networks, local or wide area networks, publicly available global networks (e.g., the Internet), ad hoc networks, short-range communication links, or a combination thereof.

The server 106 may be embodied as any type of device(s) capable of performing the functions described herein. In some embodiments, the server 106 may be configured to manage credentials of the access control system 100. For example, depending on the particular embodiment, the server 106 may be responsible for ensuring that the access control devices 108 have updated authorized credentials, whitelists, blacklists, device parameters, and/or other suitable data. Additionally, in some embodiments, the server 106 may receive audit data (e.g., security data, raw sensor data, usage data, and/or other relevant audit data) from the access control devices 108 for management of the access control system 100. In some embodiments, it should be appreciated that the server 106 may be configured to communicate with multiple access control devices 108 at a single site (e.g., a particular building) and/or across multiple sites. That is, in such embodiments, the server 106 may be configured to receive data from access control devices 108 distributed across a single building, multiple buildings on a single campus, or across multiple locations.

It should be further appreciated that, although the server 106 is described herein as a computing device outside of a cloud computing environment, in other embodiments, the server 106 may be embodied as a cloud-based device or collection of devices within a cloud computing environment 114. Further, in cloud-based embodiments, the server 106 may be embodied as a "serverless" or server-ambiguous computing solution, for example, that executes a plurality of instructions on-demand, contains logic to execute instructions only when prompted by a particular activity/trigger, and does not consume computing resources when not in use. That is, the server 106 may be embodied as a virtual computing environment residing "on" a computing system (e.g., a distributed network of devices) in which various virtual functions (e.g., Lamba functions, Azure functions, Google cloud functions, and/or other suitable virtual functions) may be executed corresponding with the functions of the server 106 described herein. For example, when an event occurs (e.g., data is transferred to the server 106 for handling), the virtual computing environment may be communicated with (e.g., via a request to an API of the virtual computing environment), whereby the API may route the request to the correct virtual function (e.g., a particular server-ambiguous computing resource) based on a set of rules. As such, when a request for the transmission of access control data is made (e.g., via an appropriate user interface to the server 106), the appropriate virtual function(s) may be executed to perform the actions before eliminating the instance of the virtual function(s).

The access control device 108 may be embodied as any type of device capable of controlling access through a passageway. For example, in various embodiments, the access control device 108 may be embodied as an electronic lock (e.g., a mortise lock, a cylindrical lock, or a tubular lock), an exit device (e.g., a pushbar or pushpad exit device), a door closer, an auto-operator, a motorized latch/bolt (e.g., for a sliding door), barrier control device (e.g., battery-powered), or a peripheral controller of a passageway. It should be further appreciated that the access control device 108 may include a lock mechanism configured to control access through the passageway and/or other components typical of a lock device. For example, the lock mechanism may include a deadbolt, latch bolt, level, and/or other mechanism adapted to move between a locked state and an unlocked state. In the illustrative embodiment, the access control device 108 is configured to communicate with the server 106 to receive access control data and/or command data from the mobile device 102 (e.g., to lock or unlock a lock mechanism). Additionally, as described in reference to FIG. 3, the illustrative access control device 108 includes, among other components, a BLE circuitry 302, a main microprocessor 304, and a Wi-Fi circuitry 306. In other embodiments, however, rather than forming separate circuitries, it should be appreciated that the BLE circuitry 302, the main microprocessor 304, and the Wi-Fi circuitry 306 may be composed/decomposed in any other physical configuration/combination consistent with the techniques described herein.

The wireless access point 110 may be embodied as any one or more devices that, individually or collectively, allow Wi-Fi devices to connect to a wired network and/or the Internet. For example, in some embodiments, the wireless access point 110 may be embodied as a gateway device that is communicatively coupled to a router. In other embodiments, the wireless access point 110 may form an integral component of or otherwise form a portion of the router itself. For simplicity and clarity of the description, the wireless access point 110 is described herein as being communicatively coupled to the Internet.

It should be appreciated that each of the mobile device 102, the server 106, the access control device 108, and/or the wireless access point 110 may be embodied as one or more computing devices similar to the computing device 200 described below in reference to FIG. 2. For example, in the illustrative embodiment, each of the mobile device 102, the server 106, the access control device 108, and the wireless access point 110 includes a processing device 202 and a memory 206 having stored thereon operating logic 208 (e.g., a plurality of instructions) for execution by the processing device 202 for operation of the corresponding device.

Figure 2:
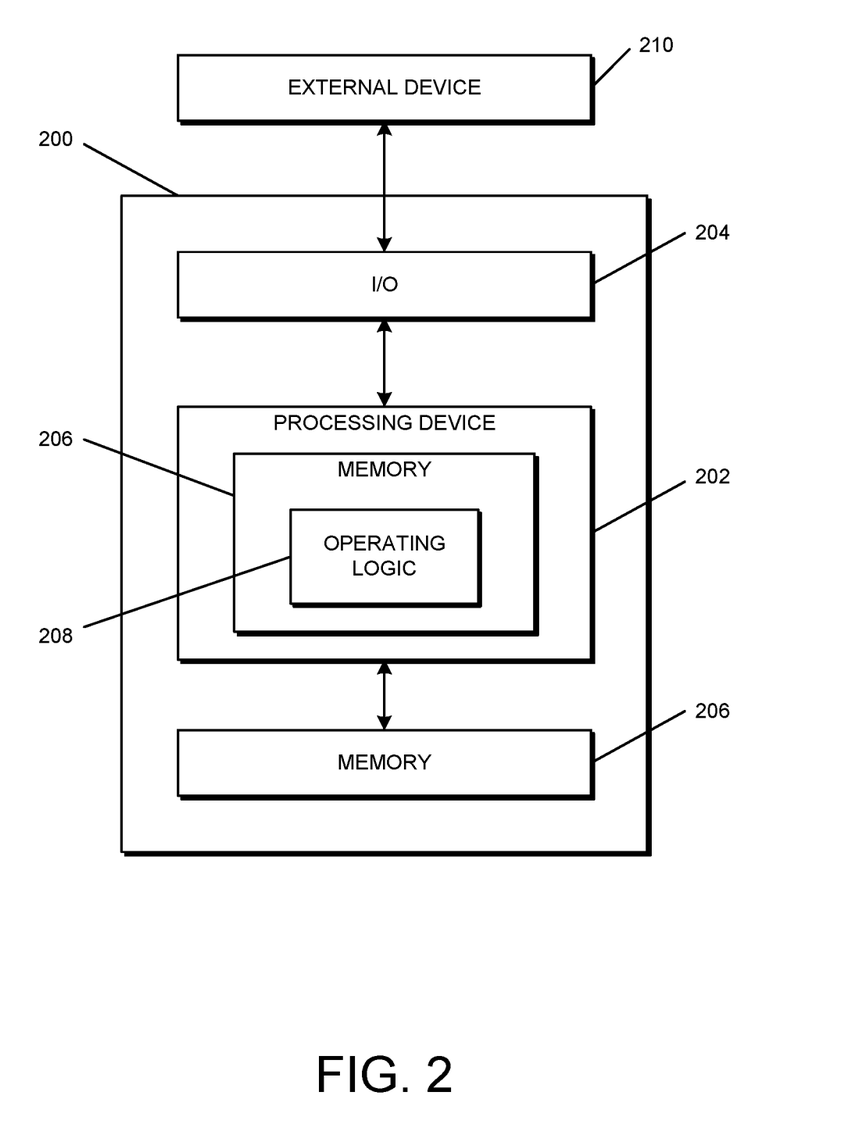
FIG. 2 is a simplified block diagram of at least one embodiment of a computing system.

Referring now to FIG. 2, a simplified block diagram of at least one embodiment of a computing device 200 is shown. The illustrative computing device 200 depicts at least one embodiment of a mobile device, server, access control device, and/or wireless access point that may be utilized in connection with the mobile device 102, the server 106, the access control device 108, and/or the wireless access point 110 illustrated in FIG. 1. Depending on the particular embodiment, the computing device 200 may be embodied as a mobile computing device, server, access control device, desktop computer, laptop computer, tablet computer, notebook, netbook, Ultrabook™, cellular phone, smartphone, wearable computing device, personal digital assistant, Internet of Things (IoT) device, control panel, processing system, wireless access point, router, gateway, and/or any other computing, processing, and/or communication device capable of performing the functions described herein.

The computing device 200 includes a processing device 202 that executes algorithms and/or processes data in accordance with operating logic 208, an input/output device 204 that enables communication between the computing device 200 and one or more external devices 210, and memory 206 which stores, for example, data received from the external device 210 via the input/output device 204.

The input/output device 204 allows the computing device 200 to communicate with the external device 210. For example, the input/output device 204 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry of the computing device 200 may be configured to use any one or more communication technologies (e.g., wireless or wired communications) and associated protocols (e.g., Ethernet, Bluetooth®, Wi-Fi®, WiMAX, etc.) to effect such communication depending on the particular computing device 200. The input/output device 204 may include hardware, software, and/or firmware suitable for performing the techniques described herein.

The external device 210 may be any type of device that allows data to be inputted or outputted from the computing device 200. For example, in various embodiments, the external device 210 may be embodied as the mobile device 102, the server 106, the access control device 108, and/or the wireless access point 110. Further, in some embodiments, the external device 210 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 210 may be integrated into the computing device 200.

The processing device 202 may be embodied as any type of processor(s) capable of performing the functions described herein. In particular, the processing device 202 may be embodied as one or more single or multi-core processors, microcontrollers, or other processor or processing/controlling circuits. For example, in some embodiments, the processing device 202 may include or be embodied as an arithmetic logic unit (ALU), central processing unit (CPU), digital signal processor (DSP), and/or another suitable processor(s). The processing device 202 may be a programmable type, a dedicated hardwired state machine, or a combination thereof. Processing devices 202 with multiple processing units may utilize distributed, pipelined, and/or parallel processing in various embodiments. Further, the processing device 202 may be dedicated to performance of just the operations described herein, or may be utilized in one or more additional applications. In the illustrative embodiment, the processing device 202 is programmable and executes algorithms and/or processes data in accordance with operating logic 208 as defined by programming instructions (such as software or firmware) stored in memory 206. Additionally or alternatively, the operating logic 208 for processing device 202 may be at least partially defined by hardwired logic or other hardware. Further, the processing device 202 may include one or more components of any type suitable to process the signals received from input/output device 204 or from other components or devices and to provide desired output signals. Such components may include digital circuitry, analog circuitry, or a combination thereof.

The memory 206 may be of one or more types of non-transitory computer-readable media, such as a solid-state memory, electromagnetic memory, optical memory, or a combination thereof. Furthermore, the memory 206 may be volatile and/or nonvolatile and, in some embodiments, some or all of the memory 206 may be of a portable type, such as a disk, tape, memory stick, cartridge, and/or other suitable portable memory. In operation, the memory 206 may store various data and software used during operation of the computing device 200 such as operating systems, applications, programs, libraries, and drivers. It should be appreciated that the memory 206 may store data that is manipulated by the operating logic 208 of processing device 202, such as, for example, data representative of signals received from and/or sent to the input/output device 204 in addition to or in lieu of storing programming instructions defining operating logic 208. As shown in FIG. 2, the memory 206 may be included with the processing device 202 and/or coupled to the processing device 202 depending on the particular embodiment. For example, in some embodiments, the processing device 202, the memory 206, and/or other components of the computing device 200 may form a portion of a system-on-a-chip (SoC) and be incorporated on a single integrated circuit chip.

In some embodiments, various components of the computing device 200 (e.g., the processing device 202 and the memory 206) may be communicatively coupled via an input/output subsystem, which may be embodied as circuitry and/or components to facilitate input/output operations with the processing device 202, the memory 206, and other components of the computing device 200. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 200 may include other or additional components, such as those commonly found in a typical computing device (e.g., various input/output devices and/or other components), in other embodiments. It should be further appreciated that one or more of the components of the computing device 200 described herein may be distributed across multiple computing devices. In other words, the techniques described herein may be employed by a computing system that includes one or more computing devices. Additionally, although only a single processing device 202, I/O device 204, and memory 206 are illustratively shown in FIG. 2, it should be appreciated that a particular computing device 200 may include multiple processing devices 202, I/O devices 204, and/or memories 206 in other embodiments. Further, in some embodiments, more than one external device 210 may be in communication with the computing device 200.

As used herein, "Bluetooth" includes traditional Bluetooth Basic Rate/Enhanced Rate (BR/EDR) technology and Bluetooth Low Energy (BLE) technology and refers to one or more components, architectures, communication protocols, and/or other systems, structures, or processes defined by and/or compliant with one or more Bluetooth specifications, addendums, and/or supplements overseen by the Bluetooth Special Interest Group (SIG) including, for example, active, legacy, withdrawn, deprecated, and/or subsequently introduced Bluetooth Core Specifications (CSs) (Bluetooth CS Version 1.0B, Bluetooth CS Version 1.1, Bluetooth CS Version 1.2, Bluetooth CS Version 2.0+EDR, Bluetooth CS Version 2.1+EDR, Bluetooth CS Version 3.0+HS, Bluetooth CS Version 4.0, Bluetooth CS Version 4.1, Bluetooth CS Version 4.2, Bluetooth CS Version 5.0); active, legacy, withdrawn, deprecated, and/or subsequently introduced Bluetooth Core Specification Addendums (CSAs) (Bluetooth CSA Version 1, Bluetooth CSA Version 2, Bluetooth CSA Version 3, Bluetooth CSA Version 4, Bluetooth CSA Version 5, Bluetooth CSA Version 6); Bluetooth Core Specification Supplements (CSSs) (Bluetooth CSS Version 1, Bluetooth CSS Version 2, Bluetooth CSS Version 3, Bluetooth CSS Version 4, Bluetooth CSS Version 5, Bluetooth CSS Version 6, Bluetooth CSS Version 7); active, legacy, withdrawn, deprecated, and/or subsequently introduced Bluetooth Mesh Networking Specifications (Bluetooth Mesh Profile Specification 1.0, Bluetooth Mesh Model Specification 1.0, Bluetooth Mesh Device Properties 1.0); active, legacy, withdrawn, deprecated, and/or subsequently introduced Bluetooth Traditional Profile Specifications (3DSP, A2DP, AVRCP, BIP, BPP, CTN, DI, DUN, FTP, GAVDP, GNSS, GOEP, GPP, HCRP, HDP, HFP, HID, HSP, MAP, MPS, OPP, PAN, PBAP, SAP, SPP, SYNCH, VDP); active, legacy, withdrawn, deprecated, and/or subsequently introduced Bluetooth Protocol Specifications (AVCTP, AVDTP, BNEP, IrDA, MCAP, RFCOMM, 3WIRE, SD, TCP, UART, USB, WAPB); active, legacy, withdrawn, deprecated, and/or subsequently introduced Bluetooth Generic Attribute Profile (GATT) services, characteristics, declarations, descriptors, and profiles (ANP, ANS, AIOP, AIOS, BAS, BCS, BLP, BLS, BMS, CGMP, CGMS, CPP, CPS, CSCP, CSCS, CTS, DIS, ESP, ESS, FMP, FTMP, FTMS, GSS, GLP, GLS, HIDS, HOGP, HPS, HRP, HRS, HTP, HTS, IAS, IDP, IDS, IPS, IPSP, LLS, LNP, LNS, NDCS, OTP, OTS, PASP, PASS, PXP, PLXP, PLXS, RCP, RCS, RSCP, RSCS, TRUS, ScPP, ScPS, TDS, TIP, TPS, UDS, WSP, WSS); and/or other Bluetooth specifications, addendums, and/or supplements.

Figure 3:
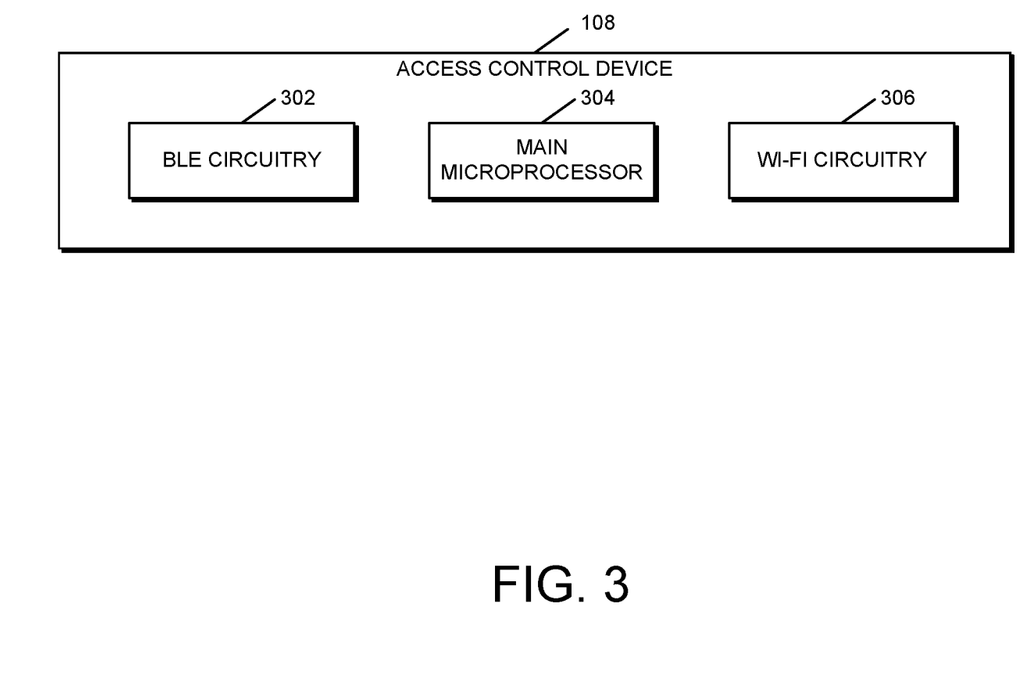
FIG. 3 is a simplified block diagram of at least one embodiment of an access control device of the system of FIG. 1.

It should be further appreciated that the access control device 108 may include, more specifically, a BLE circuitry 302, a main microprocessor 304, and a Wi-Fi circuitry 306 as shown in FIG. 3.

The BLE circuitry 302 may be embodied as or include any type of circuitry or collection of circuitries (e.g., chipsets) suitable for performing Bluetooth communication (e.g., BLE communication) with other devices in the system 100 (e.g., mobile devices 102) and otherwise performing the functions described herein. Although described herein as being "BLE" circuitry in the illustrative embodiment, it should be appreciated that the circuitry 302 may be embodied as traditional Bluetooth Basic Rate/Enhanced Rate (BR/EDR) communication circuitry in other embodiments. Further, depending on the particular embodiment, the BLE circuitry 302 may be compliant with any one or more of the Bluetooth specifications set forth herein or newer.

The main microprocessor 304 may be embodied as or include any type of device or collection of devices capable of processing data and otherwise performing the functions described herein. For example, in some embodiments, the main microprocessor 304 may be embodied as a processing device similar to the processing device 202 of FIG. 2. Further, it should be appreciated that the main microprocessor 304 may be configured to operate in multiple power states. For example, in the illustrative embodiment, the main microprocessor 304 is configured to operate in a normal power state and a low power sleep state that consumes less power than the normal power state. In other embodiments, it should be appreciated that the main microprocessor 304 may be configured to operate in more than two power states (e.g., having multiple low power states).

The Wi-Fi circuitry 306 may be embodied as or include any type of circuitry or collection of circuitries (e.g., chipsets) suitable for performing Wi-Fi-based communication with other devices in the system 100 (e.g., the wireless access point 110). As described herein, it should be appreciated that the Wi-Fi circuitry 306 may be configured to operate in multiple power states. For example, in the illustrative embodiment, the Wi-Fi circuitry 306 is configured to operate in a normal power state and a low power sleep state that consumes less power than the normal power state. In other embodiments, it should be appreciated that the Wi-Fi circuitry 306 may be configured to operate in more than two power states (e.g., having multiple low power states). Although described herein by the same name for simplicity, it should be appreciated that the normal and low power sleep states of the main microprocessor 304 and the Wi-Fi circuitry 306 may be different power states, for example, having different levels of power consumption. Further, as indicated above, rather than forming separate circuitries, it should be appreciated that the BLE circuitry 302, the main microprocessor 304, and the Wi-Fi circuitry 306 may be composed/decomposed in another suitable physical configuration/combination in other embodiments.

Figure 4:
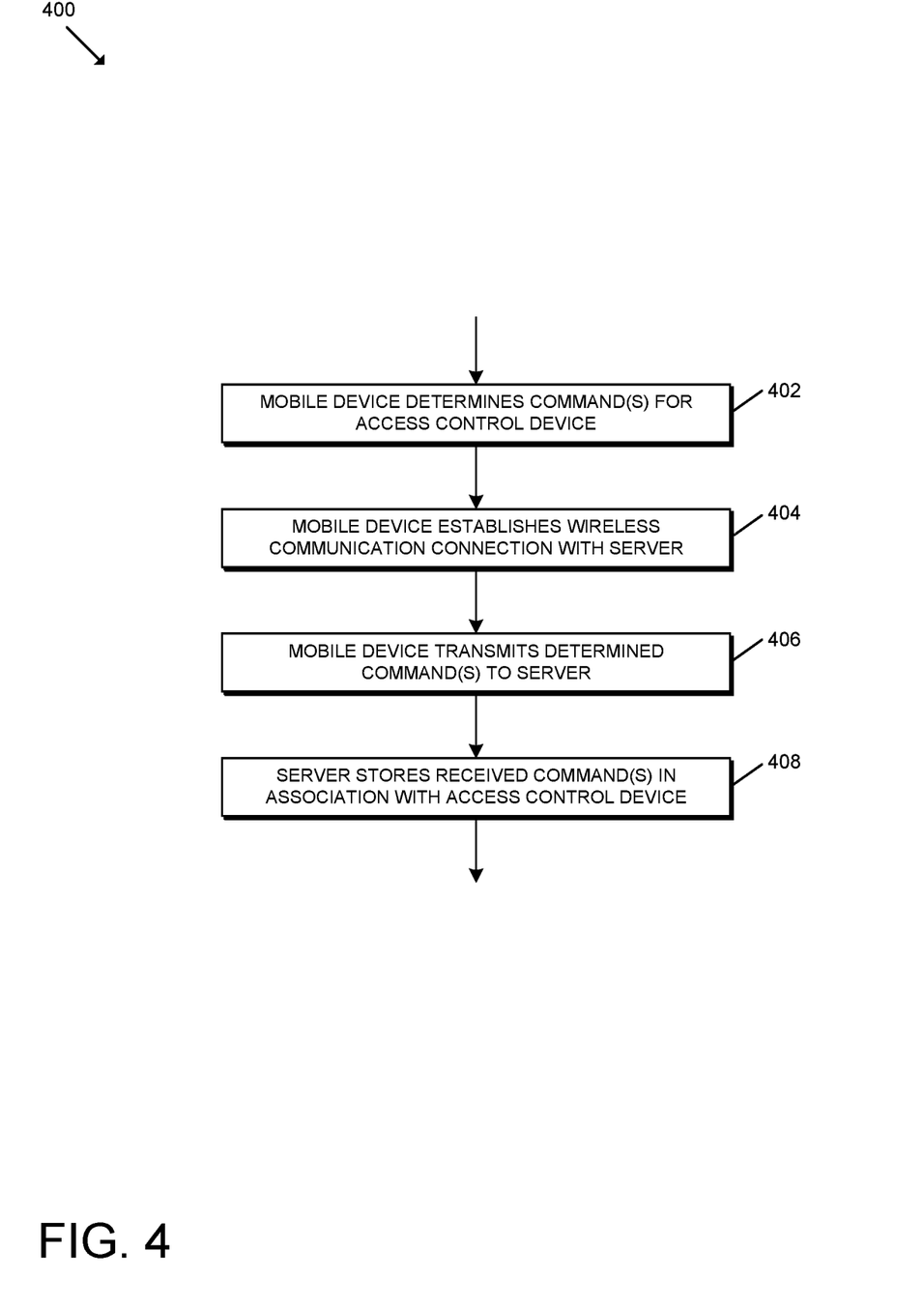
FIG. 4 is a simplified flow diagram of at least one embodiment of a method for communicating commands for an access control device from a mobile device to a server of the system of FIG. 1.

Referring now to FIG. 4, in use, the system 100 may execute a method 400 for communicating commands for the access control device 108 from the mobile device 102 to the server 106. It should be appreciated that the particular blocks of the method 400 are illustrated by way of example, and such blocks may be combined or divided, added or removed, and/or reordered in whole or in part depending on the particular embodiment, unless stated to the contrary. The illustrative method 400 begins with block 402 in which the mobile device 102 determines one or more commands and/or other access control data to be issued/sent to the access control device 108. It should be appreciated that the particular commands and/or access control data may vary depending on the particular embodiment. For example, the commands may include a command to unlock a lock mechanism of the access control device 108, lock a lock mechanism of the access control device 108, retrieve a firmware update for the access control device 108, retrieve updated access control permissions, retrieve updated access control schedules, and/or other suitable commands/data. Further, in some embodiments, the mobile device 102 may determine or identify relevant credential data associated with a user of the mobile device 102 and/or the mobile device 102 itself.

In block 404, the mobile device 102 establishes a wireless communication connection with the server 106 for transmission of the command(s) and/or access control data. It should be appreciated that the wireless communication connection may be established according to any suitable communication protocol and/or using any suitable networks (e.g., cellular communication, Internet-based communication, etc.). In block 406, the mobile device 102 transmits the determined command(s) and/or access control data to the server 106. Further, in some embodiments, it should be appreciated that the server 106 may authenticate the mobile device 102 and/or its user. Accordingly, the mobile device 102 may transmit any relevant credential data, PIN data, and/or other authentication data, and the mobile device 102 and server 106 may execute a suitable authentication algorithm. It should be appreciated that, in some embodiments, one or more other wired and/or wireless techniques may be used to transmit commands to the server 106 (e.g., via web application, Postman, or another suitable technology or protocol).

In block 408, the server 106 stores the received command(s) and/or access control data in association with the access control device 108. For example, the server 106 may utilize a database that stores the received command(s) and/or access control data and associates the stored data with the relevant access control device 108 such that it can be subsequently retrieved by the access control device 108 as described herein.

Although the blocks 402-408 are described in a relatively serial manner, it should be appreciated that various blocks of the method 400 may be performed in parallel in some embodiments. Further, it should be appreciated that, in other embodiments, the system 100 may execute a different method for communicating commands for the access control device 108 to the server 106.

Figure 5:
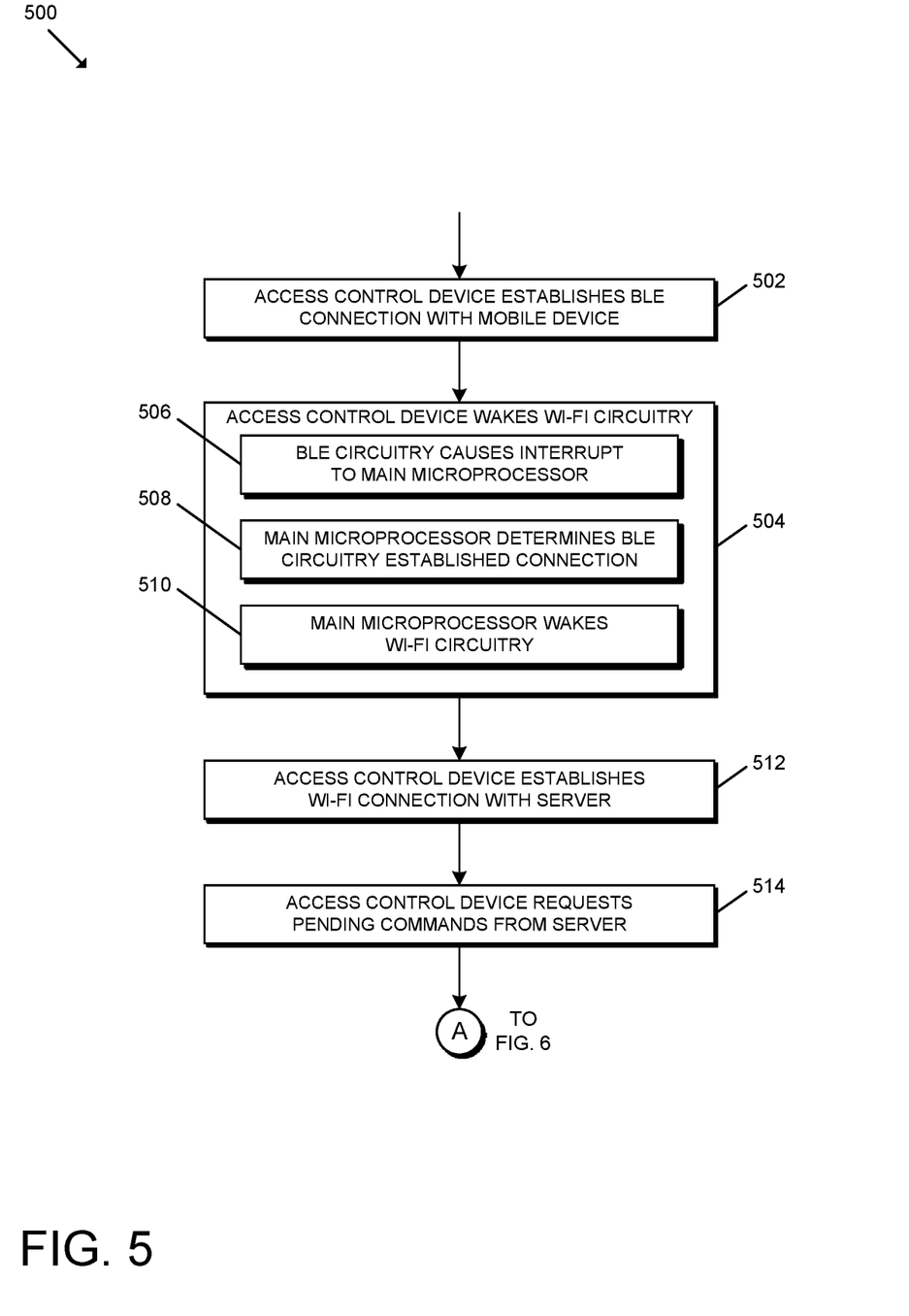
FIGS. 5 and 6 are a simplified flow diagram of at least one embodiment of a method for associating Wi-Fi circuitry of an access control device with a wireless access point and communicating data to the access control device of the system of FIG. 1.
Figure 6:
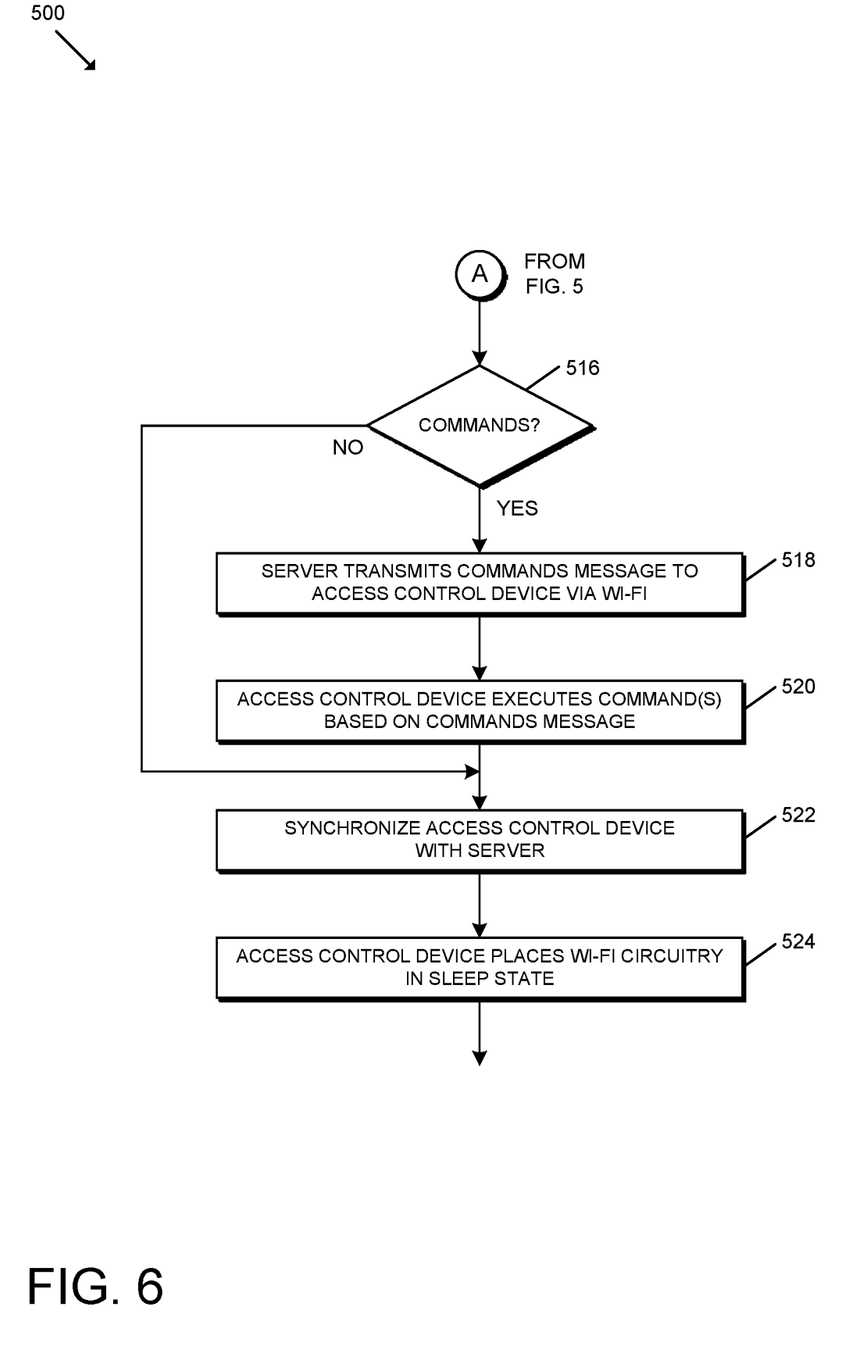

Referring now to FIGS. 5-6, in use, the system 100 may execute a method 500 for associating the Wi-Fi circuitry 306 of the access control device 108 with the wireless access point 110 and communicating access control data to the access control device 108. It should be appreciated that the particular blocks of the method 500 are illustrated by way of example, and such blocks may be combined or divided, added or removed, and/or reordered in whole or in part depending on the particular embodiment, unless stated to the contrary. In the illustrative embodiment, the method 500 is commenced when the main microprocessor 304 and the Wi-Fi circuitry 306 of the access control device 108 are in corresponding low power sleep states.

The illustrative method 500 begins with block 502 of FIG. 5 in which the access control device 108 establishes a BLE connection with a mobile device 102 (e.g., the mobile device 102 described in reference to the method 400 of FIG. 4 or a different mobile device 102). For example, a mobile device 102 may come within BLE communication range of the access control device 108 and establish a "low-level" BLE connection with the access control device 108 (e.g., in response to a BLE advertisement). In particular, in the illustrative embodiment, the "low-level" BLE connection (e.g., via a "BLE Connect" function) may be an initial connection between the mobile device 102 and the access control device 108 such that the mobile device 102 can be an unpaired device (e.g., before any credential information is transmitted from the mobile device 102 to the access control device 108). It should be appreciated that the mobile device 102 that establishes the BLE connection with the access control device 108 may or may not be the same as, or related to, the mobile device 102 that transmitted the command(s) and/or access control data to the server 106 as described in reference to the method 400 of FIG. 4.

In block 504, the access control device 108 wakes its Wi-Fi circuitry 306 in response to the BLE connection. In particular, in block 506, the BLE circuitry 302 of the access control device 108 causes (e.g., generates or sends) an interrupt to the main microprocessor 304 that wakes the main microprocessor 304 from the low power sleep state in the illustrative embodiment. In other words, the main microprocessor 304 transitions from the low power sleep state to the normal power state in response to the interrupt. In block 508, the illustrative main microprocessor 304 determines that the BLE circuitry 302 has established a connection with another device (e.g., the mobile device 102) and, in block 510, the main microprocessor 304 wakes the Wi-Fi circuitry 306 from the lower power sleep state. In particular, in some embodiments, the main microprocessor 304 may execute a "start function" that triggers the Wi-Fi circuitry 306 to transition from the low power sleep state to the normal power state. In other embodiments, the access control device 108 may otherwise wake its Wi-Fi circuitry 306 in response to the BLE connection.

In block 512, the access control device 108 establishes a Wi-Fi communication connection with the server 106 using the Wi-Fi circuitry 306. More specifically, the access control device 108 may establish a Wi-Fi communication connection/link with the wireless access point 110, which is communicatively coupled to the server 106 (e.g., over the Internet).

In block 514, the access control device 108 requests any pending commands and/or other access control data from the server 106 via the Wi-Fi communication connection. The server 106 determines whether it has stored thereon, or otherwise has access to, commands and/or other access control data associated with the requesting access control device 108. For example, the server 106 may store such data in a database in association with the corresponding access control device 108 for simplified searching.

If the server 106 determines, in block 516 of FIG. 6, that it has stored thereon, or otherwise has access to, one or more commands and/or other access control data associated with the requesting access control device 108, the method 500 advances to block 518 in which the server 106 transmits a commands message to the access control device 108 via the Wi-Fi communication connection (e.g., via the connection between the server 106 and the wireless access point 110 and further via the Wi-Fi connection between the wireless access point 110 and the access control device 108). It should be appreciated that the commands message may include the command(s) and/or access control data retrieved by the server 106 (e.g., received by the mobile device 102 by virtue of the method 400 of FIG. 4). In some embodiments, the commands message may, additionally or alternatively, provide access instructions and/or directions for retrieving the relevant data from a particular source. As indicated above, it should be appreciated that the command(s) may include, for example, a command to unlock a lock mechanism of the access control device 108, lock a lock mechanism of the access control device 108, retrieve a firmware update for the access control device 108, retrieve updated access control permissions, retrieve updated access control schedules, and/or other suitable commands/data. As such, in block 520, the access control device 108 may execute one or more commands associated with the commands message by performing the commanded function(s). The method 500 advances to block 522.

Similarly, if the server 106 determines, in block 516, that is does not have stored thereon, or otherwise have access to, any commands or access control data associated with the requesting access control device 108, the method 500 advances to block 522 in which the access control device 108 is synchronized with the server 106 via the Wi-Fi communication connection (e.g., via the Wi-Fi connection between access control device 108 and the wireless access point 110 and further via the connection between the wireless access point 110 and the server 106). In doing so, in some embodiments, the access control device 108 may determine whether it has audit data (e.g., security data, raw sensor data, usage data, and/or other relevant audit data) and/or other relevant data to transmit to the server 106. For example, in some embodiments, the access control device 108 may transmit state data indicative of a current state of the access control device 108 (e.g., the current operational state of a lock mechanism and/or other component(s) of the access control device 108). Although the blocks 516-520 and the block 522 are illustrated serially, it should be appreciated that those blocks may be performed in parallel in some embodiments.

In block 524, the access control device 108 places the Wi-Fi circuitry 306 in the low power sleep state. Further, in some embodiments, the access control device 108 may also transition the main microprocessor 304 from the normal power state to the low power sleep state (e.g., subsequent to processing any relevant data associated with the method 500).

Although the blocks 502-524 are described in a relatively serial manner, it should be appreciated that various blocks of the method 500 may be performed in parallel in some embodiments.

In some embodiments, it should be appreciated that the access control device 108 may be triggered to wake up the Wi-Fi circuitry 306 and/or the main microprocessor 304 according to another mechanism. For example, in some embodiments, the access control device 108 may include a physical button, handle, or actuator that may be contacted by the user to wake up the access control device 108 components. In another embodiment, the access control device 108 may include a timer that will wake up with Wi-Fi circuitry 306 and/or the main microprocessor 304 after a predetermined period of time has lapsed. It should be appreciated that the access control device 108 may utilize multiple triggers in some embodiments.

According to an embodiment, a method includes establishing, by Bluetooth Low Energy (BLE) circuitry of an access control device, a BLE communication connection with a first mobile device while a main microprocessor and a Wi-Fi circuitry of the access control device are in sleep states, waking, by the access control device, the Wi-Fi circuitry of the access control device from the sleep state in response to establishing the BLE communication connection with the mobile device, establishing, by the Wi-Fi circuitry of the access control device, a Wi-Fi communication connection with an access control server in response to waking the Wi-Fi circuitry from the sleep state, and receiving, by the access control device and from the access control server via the Wi-Fi communication connection, access control data for the access control device transmitted from a second mobile device to the access control server. In some embodiments, waking the Wi-Fi circuitry of the access control device from the sleep state may include generating, by the BLE circuitry, an interrupt to the main microprocessor that wakes the main microprocessor from the sleep state in response to establishing the BLE connection with the first mobile device and waking, by the main microprocessor, the Wi-Fi circuitry in response to the interrupt. In some embodiments, establishing the Wi-Fi communication connection with the access control server may include establishing a Wi-Fi communication with a wireless access point that is communicatively coupled with the access control server over the Internet. In some embodiments, receiving the access control data may include transmitting, by the access control device and to the access control server, a request for pending access control commands associated with the access control device and receiving, by the access control device and from the access control server, at least one pending access control command stored in association with the access control device. In some embodiments, the at least one pending access control command may include a command to one of lock a lock mechanism of the access control device or unlock the lock mechanism of the access control device. In some embodiments, the method may further include executing, by the access control device, the at least one pending access control command. In some embodiments, the method may further include transmitting, by the access control device and to the access control server via the Wi-Fi communication connection, audit data associated with the access control device. In some embodiments, the method may further include placing the Wi-Fi circuitry in the sleep state in response to receiving the access control data from the access control server. In some embodiments, the method may further include transmitting, by the second mobile device, the access control data to the access control server via a wireless communication connection between the second mobile device and the access control server and storing, by the access control server, the access control data in association with the access control device. In some embodiments, the first mobile device may be different from the second mobile device. In some embodiments, the server may be executed in a cloud computing environment.

According to another embodiment, an access control device includes a main microprocessor configured to operate in at least a first normal power state and a first sleep state, a Wi-Fi circuitry configured to operate in at least a second normal power state and a second sleep state, and a Bluetooth Low Energy (BLE) circuitry configured to establish a BLE communication connection with a first mobile device while the main microprocessor is in the first sleep state and the Wi-Fi circuitry is in the second sleep state and generate an interrupt to the main microprocessor that transitions the main microprocessor from the first sleep state to the first normal power state, wherein the main microprocessor is configured to transition the Wi-Fi circuitry from the second sleep state to the second normal power state in response to the interrupt, and the Wi-Fi circuitry is configured to establish a Wi-Fi communication connection with an access control server in response to transitioning to the second normal power state and receive access control data from the access control device transmitted from a second mobile device to the access control server. In some embodiments, to establish the Wi-Fi communication connection with the access control server may include to establish a Wi-Fi communication with a wireless access point that is communicatively coupled with the access control server over the Internet. In some embodiments, to receive the access control data may include to transmit a request for pending access control commands associated with the access control device to the access control server and receive at least one pending access control command stored in association with the access control device from the access control server. In some embodiments, the access control device may further include an electronic lock mechanism adapted to move between a locked position and an unlocked position, and the at least one pending access control command may include a command to one of move the electronic lock mechanism to the locked position or move the electronic lock mechanism to the unlocked position. In some embodiments, the main microprocessor may be configured to execute the at least one pending access control command. In some embodiments, the Wi-Fi circuitry may return to the sleep state in response to receipt of the access control data from the access control server.

According to yet another embodiment, an access control system includes an access control server and an access control device having a main microprocessor configured to operate in at least a first normal power state and a first sleep state, a Wi-Fi circuitry configured to operate in at least a second normal power state and a second sleep state, and a Bluetooth Low Energy (BLE) circuitry configured to establish a BLE communication connection with a first mobile device while the main microprocessor is in the first sleep state and the Wi-Fi circuitry is in the second sleep state and generate an interrupt to the main microprocessor that wakes the main microprocessor from the first sleep state to the first normal power state, wherein the main microprocessor is configured to wake the Wi-Fi circuitry from the second sleep state to the second normal power state in response to the interrupt and the Wi-Fi circuitry is configured to establish a Wi-Fi communication connection with the access control server in response to entering the second normal power state and receive access control data from the access control device transmitted from a second mobile device to the access control server. In some embodiments, the access control system may further include the second mobile device, wherein the second mobile device may be configured to transmit the access control data to the access control server via a wireless communication connection between the second mobile device and the access control server, and the access control server may be configured to store the access control data in association with the access control device. In some embodiments, the first mobile device may be different from the second mobile device.

What is claimed is:

1. A method, comprising:
   establishing, by a first wireless communication circuitry of an access control device, a first wireless communication connection with a mobile device while a main microprocessor and a second wireless communication circuitry of the access control device are in a low power state;
   waking, by the access control device, the second wireless communication circuitry from the low power state in response to establishing the first wireless communication connection with the mobile device;
   establishing, by the second wireless communication circuitry, a second wireless communication connection with an access control server in response to waking the second wireless communication circuitry from the low power state; and receiving, by the access control device and from the access control server via the second wireless communication connection, data for the access control device.

2. The method of claim 1, wherein the first wireless communication circuitry comprises Bluetooth Low Energy (BLE) circuitry, and the first wireless communication connection comprises a BLE communication connection.

3. The method of claim 1, wherein the second wireless communication circuitry comprises WiFi circuitry, and the second wireless communication connection comprises a WiFi communication connection.

4. The method of claim 1, wherein one of the first wireless communication circuitry and the second wireless communication circuitry comprises Bluetooth Low Energy (BLE) circuitry; and wherein the other of the first wireless communication circuitry and the second wireless communication circuitry comprises WiFi circuitry.

5. The method of claim 1, wherein the second wireless communication circuitry is separate from the first wireless communication circuitry.

6. The method of claim 1, wherein low power state comprises a sleep state.

7. The method of claim 1, wherein the data is transmitted from a second mobile device to the access control server.

8. The method of claim 1, wherein waking the second wireless communication circuitry of the access control device from the low power state comprises:

generating, by the first wireless communication circuitry, an interrupt to the main microprocessor that wakes the main microprocessor from the low power state in response to establishing the first wireless communication connection with the mobile device; and waking, by the main microprocessor, the second wireless communication circuitry in response to the interrupt.

9. The method of claim 8, wherein waking the second wireless communication circuitry in response to the interrupt comprises executing one or more executable instructions by the main microprocessor to trigger the second wireless communication circuitry to transition from the low power state to a higher power state.

10. The method of claim 1, wherein receiving the data comprises:

transmitting, by the access control device and to the access control server, a request for one or more messages; and receiving, by the access control device and from the access control server, the one or more messages.

11. The method of claim 10, wherein the one or more messages comprise one or more access control messages associated with the access control device.

12. The method of claim 11, wherein the one or more messages comprises a command to one of locking a lock mechanism of the access control device or unlocking the lock mechanism of the access control device.

13. The method of claim 10, wherein the one or more messages comprises i) a command to retrieve a firmware update for the access control device, or ii) a command to retrieve at least one of updated access control permissions or updated access control schedules for the access control device.

14. The method of claim 1, further comprising transmitting, by the access control device and to the access control server via the second wireless communication connection, audit data associated with the access control device.

15. The method of claim 1, wherein the data comprises access control data.

16. An access control device, comprising:

a main microprocessor configured to operate in at least a first low power state and a first higher power state;

a first wireless communication circuitry configured to operate in at least a second low power state and a second higher power state; and a second wireless communication circuitry configured to (i) establish a first wireless communication connection with a mobile device while the main microprocessor is in the first low power state and the first wireless communication circuitry is in the second low power state and (ii) generate an interrupt to the main microprocessor that transitions the main microprocessor from the first low power state to the first higher power state;

wherein the main microprocessor is configured to transition the first wireless communication circuitry from the second low power state to the second higher power state in response to the interrupt; and wherein the first wireless communication circuitry is configured to (i) establish a second wireless communication connection with an access control server in response to transitioning to the second higher power state and (ii) receive data from the access control device.

17. The access control device of claim 16, wherein the first wireless communication circuitry comprises Bluetooth Low Energy (BLE) circuitry, and the first wireless communication connection comprises a BLE communication connection; and wherein the second wireless communication circuitry comprises WiFi circuitry, and the second wireless communication connection comprises a WiFi communication connection.

18. The access control device of claim 16, wherein the data received from the access control device is transmitted from a second mobile device to the access control server.

19. The access control device of claim 16, wherein to receive the data comprises to:

transmit a request for one or more messages associated with the access control device to the access control server; and receive at least one message stored in association with the access control device from the access control server.

20. The access control device of claim 19, further comprising an electronic lock mechanism adapted to move between a locked position and an unlocked position; and wherein the at least one message comprises a command to move the electronic lock mechanism to the locked position or move the electronic lock mechanism to the unlocked position.

21. An access control system comprising the access control device of claim 16 and the access control server.

22. The access control device of claim 16, wherein the data comprises access control data.

* * * * *